United States Patent
Faidi

(10) Patent No.: US 10,508,832 B2
(45) Date of Patent: Dec. 17, 2019

(54) SWIMMING POOL COVER WITH LENSES

(71) Applicant: Namir Faidi, Tiburon, CA (US)

(72) Inventor: Namir Faidi, Tiburon, CA (US)

(*) Notice: Subject to any disclaimer, the term of this patent is extended or adjusted under 35 U.S.C. 154(b) by 0 days.

(21) Appl. No.: 15/403,969

(22) Filed: Jan. 11, 2017

(65) Prior Publication Data

US 2017/0241672 A1 Aug. 24, 2017

Related U.S. Application Data

(60) Provisional application No. 62/278,131, filed on Jan. 13, 2016.

(51) Int. Cl.
| | |
|---|---|
| *F24S 20/00* | (2018.01) |
| *E04H 4/10* | (2006.01) |
| *F24S 10/17* | (2018.01) |
| *F24S 23/30* | (2018.01) |

(52) U.S. Cl.
CPC ............. *F24S 20/02* (2018.05); *E04H 4/101* (2013.01); *F24S 10/17* (2018.05); *F24S 23/31* (2018.05); *Y02E 10/44* (2013.01)

(58) Field of Classification Search
CPC ............ F24S 20/02; F24S 20/70; F24S 10/17
USPC .................................................. 126/561–568
See application file for complete search history.

(56) References Cited

U.S. PATENT DOCUMENTS

| | | | | |
|---|---|---|---|---|
| 3,125,091 A | * | 3/1964 | Sleeper | F24J 2/06 |
| | | | | 126/624 |
| 3,984,881 A | | 10/1976 | Gerlach | |
| 3,984,882 A | | 10/1976 | Forman et al. | |
| 4,022,187 A | * | 5/1977 | Roberts | E04H 4/10 |
| | | | | 126/565 |
| 4,103,368 A | * | 8/1978 | Lockshaw | E04H 4/103 |
| | | | | 126/566 |
| 4,243,022 A | | 1/1981 | Pedone | |
| 4,270,232 A | * | 6/1981 | Ballew | B65D 88/36 |
| | | | | 126/566 |
| 4,291,672 A | | 9/1981 | Ricks | |
| 4,303,057 A | | 12/1981 | Crandon et al. | |
| 4,366,806 A | | 1/1983 | Acker | |
| 4,509,502 A | | 4/1985 | Youcha | |
| 5,143,051 A | | 9/1992 | Bennett | |

(Continued)

OTHER PUBLICATIONS

Anon, Solar Sun Rings, In the Swim Discount Pool Supplies, Retrieved Jan. 11, 2016, pp. 1-5, Viewed Online at; http://www.intheswim.com/p/solar-sun-rings#pdp-tab2.

(Continued)

*Primary Examiner* — Vivek K Shirsat
(74) *Attorney, Agent, or Firm* — United IP Counselors, LLC

(57) ABSTRACT

A swimming pool cover with lenses is disclosed. The swimming pool cover uses lenses to focus ambient solar energy into the water of a swimming pool. In one embodiment, a plurality of rectangular lenses is connected at their edges by a minimal amount of connecting or gusset material, in order to create an impermeable sheet, while maximizing the amount of incident solar energy absorbed by the swimming pool water. The swimming pool cover also protects detritus from falling into the swimming pool, while at the same time, reduces the amount of heat loss through evaporation. In another embodiment, the gusset material connects a plurality of lenses, varying in both size and shape.

11 Claims, 4 Drawing Sheets

(56) References Cited

U.S. PATENT DOCUMENTS

| | | | |
|---|---|---|---|
| 5,511,536 A * | 4/1996 | Bussey, Jr. | E04H 4/103 |
| | | | 126/565 |
| 5,586,548 A | 12/1996 | Hsia | |
| 5,860,413 A | 1/1999 | Bussey et al. | |
| 6,571,789 B1 | 6/2003 | Mora | |
| 2002/0023296 A1 | 2/2002 | Bussey et al. | |
| 2005/0125887 A1 | 6/2005 | Taylor | |
| 2011/0146659 A1* | 6/2011 | Rosene | F24S 10/17 |
| | | | 126/565 |
| 2012/0037150 A1 | 2/2012 | Gheyri | |
| 2012/0281609 A1 | 11/2012 | Kasslin et al. | |
| 2013/0145538 A1 | 6/2013 | Seccareccia | |

OTHER PUBLICATIONS

Anon, Types of Pool Covers, Aug. 11, 2014, pp. 1-5, Department of Energy: Swimming Pool Covers, US, Retrieved Online at: https://energy.gov/energysaver/swimming-pool-covers.

\* cited by examiner

SWIMMING POOL COVER WITH LENSES

CROSS-REFERENCE TO RELATED APPLICATIONS

This application claims priority to U.S. Provisional Patent Application No. 62/278,131, filed Jan. 13, 2016, the contents of which are incorporated by reference herein in their entirety.

BACKGROUND OF THE INVENTION

1. Field of the Invention

In general, the invention relates to swimming pool covers.

2. Description of Related Art

According to industry sources, there were 8.6 million residential swimming pools and 309,000 public swimming pools in the United States in 2013. In many areas, swimming pools are an indelible feature of the suburban landscape and a quintessential part of suburban recreation, in addition to their prominent role in exercise and athletic competition.

Most residential swimming pools are outdoors and are either in-ground or above ground. Particularly in warm climates, where an outdoor swimming pool can be used year round, the pool may be surrounded by a screened enclosure, which prevents leaves and other detritus from falling into the pool. However, screened enclosures can present considerable cost and maintenance issues, and are far from universal.

Where a screened enclosure is not available, or where the local climate is too cold for year-round swimming, swimming pools are often covered when they are not in use. Various types of swimming pool covers are available. At its most basic, a swimming pool cover may be little more than a sheet of plastic, typically vinyl. More complex versions may have insulation. Of course, not all swimming pool covers are in sheet form—U.S. Pat. No. 4,270,232 to Ballew, for example, discloses a cover made of discrete segments that float next to one another on the surface of the water. At least portions of those segments are transparent and transmit heat.

Most outdoor swimming pools are not automatically heated or cooled; the temperature of the water is thus dependent on the environment and the weather. However, the temperature of a swimming pool's water is a major factor in having a comfortable and productive swimming experience. While a basic swimming pool cover allows some amount of solar energy to be absorbed by the swimming pool water, the basic swimming pool cover only allows the pool water to absorb a fraction of the available energy. In fact, most basic swimming pool covers actually provide shade over a swimming pool, much like an umbrella, and actually reduce the amount of solar energy absorbed by the swimming pool water.

SUMMARY OF THE INVENTION

One aspect of the invention relates to a swimming pool cover comprised of a plurality of lenses. The swimming pool cover uses this plurality of lenses to focus ambient solar energy, and may result in heating of the pool water. A connecting or gusset material joins the edges of the plurality of lenses into a sheet that covers at least substantial majority of the swimming pool. In many embodiments, the swimming pool cover may be sized and shaped to cover the entire pool. In one embodiment, the lenses themselves are thin, flexible Fresnel lenses. In an additional embodiment, the individual lenses themselves are replaceable, being connected by a fastener system such as VELCRO® hook-and-loop fastener. The swimming pool cover performs other functions as well—it protects a swimming pool from detritus falling into the pool, and may also substantially reduce water loss due to evaporation.

Other aspects, features and advantages of the invention will be set forth in the description that follows.

BRIEF DESCRIPTION OF THE DRAWING FIGURES

The invention will be described with respect to the following drawing figures, in which like numerals represent like features throughout the figures, and in which.

DETAILED DESCRIPTION

Figure 1:
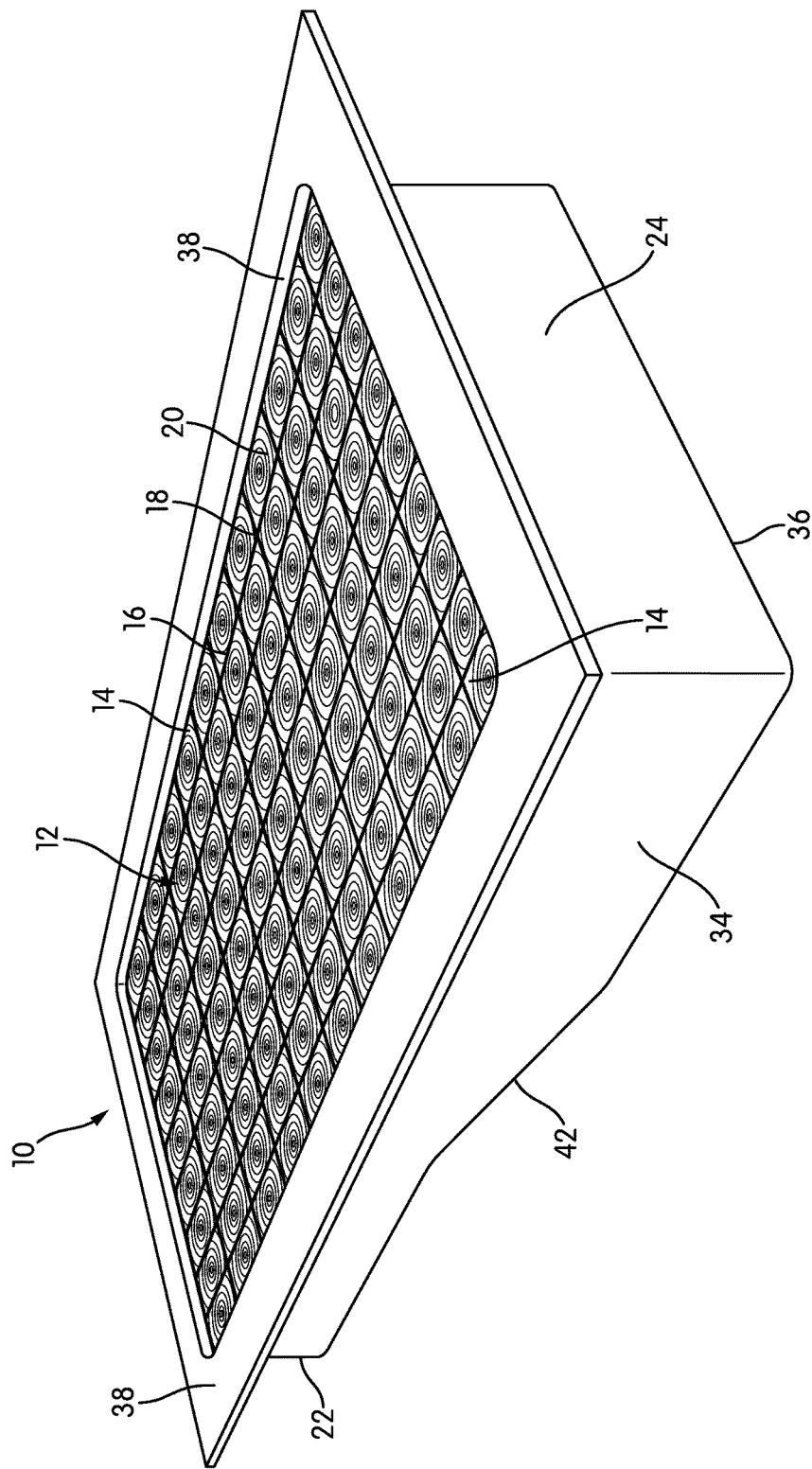
FIG. 1 is a perspective view of an swimming pool with a swimming pool cover according to one embodiment of the invention.

FIG. 1 is a perspective view of a swimming pool, generally indicated at 10. The swimming pool 10 is protected from various outdoor elements with a swimming pool cover 12, according to one embodiment of the invention. The swimming pool 10 could be either in-ground or above-ground. The swimming pool 10 of FIG. 1 has a shallow end 22 and a deep end 24 with a gradual pitch 42 connecting the two ends of the swimming pool. A pool wall 34 surrounds the depth of the swimming pool 10. The lower extent of the pool wall 34 is connected to the pool floor 36. The upper extent of the pool wall 34 flares out into a swimming pool perimeter 38. In an in-ground pool, the above-described features would typically be constructed from poured concrete, or a similar material. In an above-ground pool, the above-described features would typically be constructed of metal, FIBERGLAS™ glass fiber composite material, or other common materials.

While the swimming pool 10 of the illustrated embodiment is generally rectangular, the pool cover 12 could be made in any shape or size, and could be installed on any type of swimming pool. Not all swimming pools need have all the features described above with respect to the swimming pool 10; for example, the pool cover 12 could be used with an infinity pool, i.e., a swimming pool with a reduced or angled border that appears to merge into the ocean or other surrounding landscape.

The swimming pool cover 12 comprises a matrix of lenses 14 connected at their edges 16 by a connecting or gusset material 18. The matrix of lenses 14 forms a sheet between the perimeter 38 of the pool 10. In the illustrated embodiment, the lenses 14 are rectangular and the swimming pool cover 12 is essentially a rectangular grid of the lenses 14. However, any shape or size of lens 14 would be appropriate, so long as the lenses 14 cover a substantial portion of the area of the swimming pool cover 12. In many cases, the lenses 14 will comprise at least the majority of the surface area of the swimming pool cover 12.

While the lenses 14 of the illustrated embodiment are all the same size and shape, the sizes and shapes of the lenses 14 could also vary over the extent of the swimming pool cover, for either decorative or practical reasons. It may, for example, be desirable to have some round, triangular, or polygonally-shaped lenses for decorative reasons. Lenses 14 may have different shapes in the same swimming pool cover 12 for functional reasons as well. For example, if the swimming pool 10 is not rectangular, it may be advantageous to make lenses 14 of different shapes, so that the swimming pool cover 12 as a whole is shaped to cover the entire surface area of the pool water.

The amount of connecting material 18 used between each lens edge 16 generally depends upon the shape and size of the pool 10, as well as the shape and size of the lenses 14 that are used. In most embodiments, it will be advantageous to keep the amount of connecting material 18 between lenses to a minimum. Where connecting material 18 cannot be minimized, it may be translucent, transparent, or otherwise at least somewhat energy-transmissive.

Figure 2:
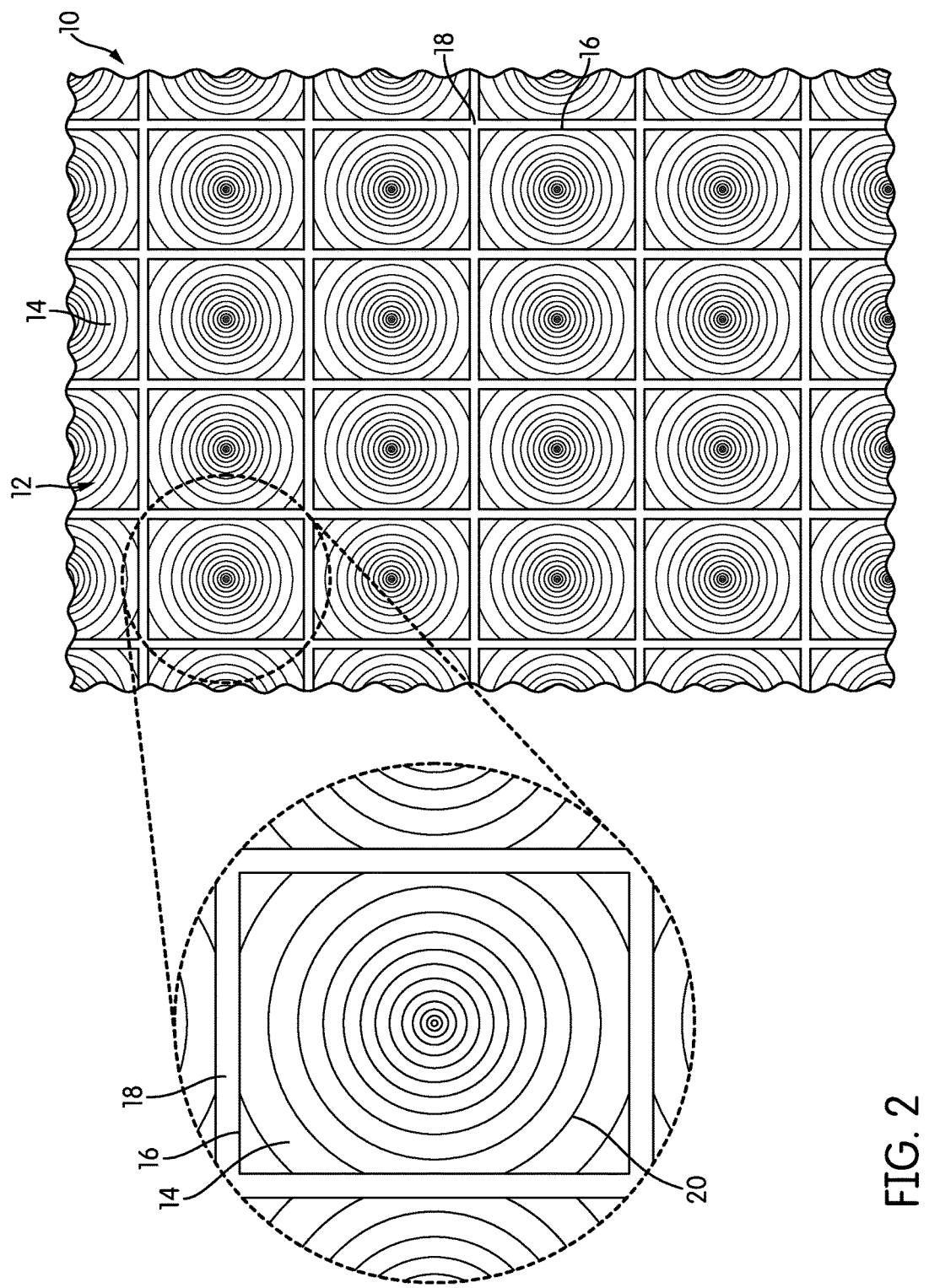
FIG. 2 is a top plan view of a portion of the swimming pool cover of FIG. 1, showing a detailed view of one lens.

FIG. 2 is a top plan view of a portion of the pool cover 12 of FIG. 1, showing the lenses 14 in greater detail. The edges 16 of adjacent lenses 14 are connected by connecting material 18 in order to create a continuous swimming pool cover 12 that, in nearly all cases will be impermeable to water. The connecting or gusset material 18 could be connected to the lens 14 by any number of methods, including adhesives, stitching, fusing, fasteners, or combinations of those methods. In one embodiment, the lenses 14 themselves are replaceable, and are connected to the connecting material 18 with a fastener system, such as VELCRO® hook-and-loop fastener, or by any other suitable fastening system. Thus, if an individual lens 14 becomes soiled, scratched, or damaged by heat or ultraviolet radiation, it can be removed and replaced.

The continuous, impermeable swimming pool cover 14 protects the areas of the swimming pool 10 it covers from collecting detritus and from exposure to wind. An additional benefit to making the swimming pool cover 12 continuously impermeable is that the swimming pool cover 12 may reduce the amount of water that evaporates from the swimming pool 10. While FIGS. 1 and 2 illustrate the swimming pool cover 12 covering the entirety of the swimming pool 10, that need not be the case in all embodiments. In some cases, a swimming pool cover 12 can be used to cover only a portion of the swimming pool 10 while other portions remain open for use.

In this embodiment of the invention, the lenses 14 are spaced together as closely as possible, so that most of the surface area of the swimming pool cover 12 is comprised of lenses. As was described briefly above, the arrangement of the plurality of lenses 14 can take any form so long as the lenses 14 form a continuous, closely packed pattern over the extent of the pool 10. Additional connective material 18 could be used to accommodate irregular shapes or fill any void spaces that would otherwise compromise the impermeability of the pool cover 12.

As may be apparent in FIG. 2, the lenses 14 of the illustrated embodiment are Fresnel lenses 14. Fresnel lenses 14 have many advantages, one of them being that Fresnel lenses are typically flatter than condensing lenses of comparable focal length. While Fresnel lenses 14 in embodiments of the invention may be made in any number of materials that have refractive indices different than that of air, it is advantageous if the material of which the Fresnel lenses 14 are made is thin and flexible, much as a conventional swimming pool cover would be. Moreover, thin, flexible Fresnel lenses that cover a relatively large area (e.g., 8.3"×11.75") are readily available as reading magnifiers from vendors such as Amazon.com, Inc. Of course, the lenses 14 may be of substantially any size. Although any light-transmissive material with a refractive index different than that of air may have some refractive effect on light, the term "lens," as used in this description, refers to an element with at least one curved surface that is intended to focus light.

Figure 3:
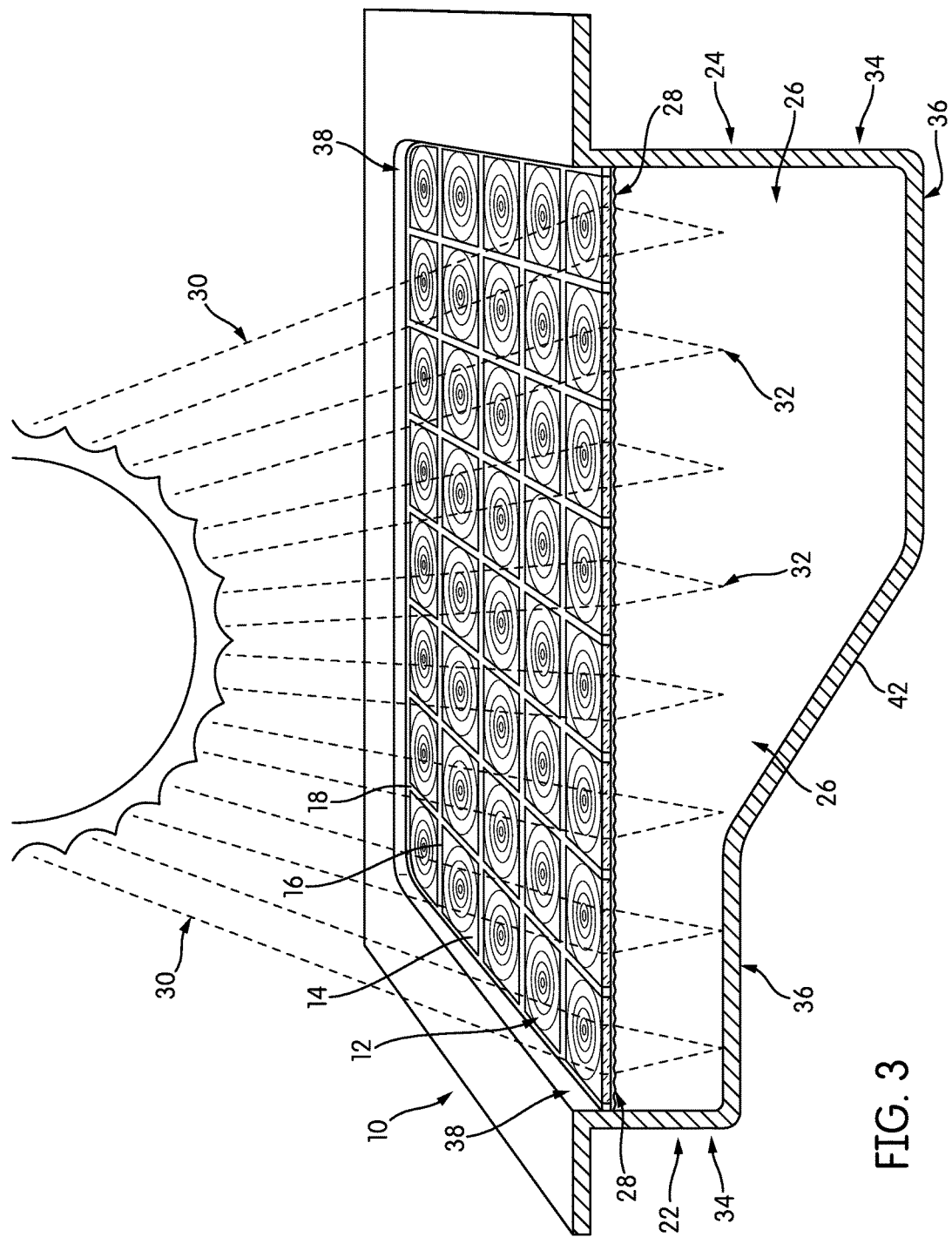
FIG. 3 is a partially sectional perspective view of the swimming pool cover of FIG. 1 illustrating the effect of the lenses.

FIG. 3 is a partially sectional perspective view of the pool cover 12 of FIG. 1, illustrating the pool cover 12 with its matrix of lenses 14. Generally speaking, the transparency of the lenses 14 will allow more light to pass through the pool water. The focusing effect of the lenses 14 may also result in more incident solar energy being directed into the pool water or less energy escaping the pool water.

The amount of incident solar energy 30 is expected to vary with the season, as well as the progression of the sun throughout the day. Because they are particularly good at focusing off-axis beams of light, Fresnel lenses 14 may be particularly well suited to gather any available solar energy 30 and transfer some amount of that energy to the swimming pool water 28.

During the evening, when solar energy 30 is not available, the pool cover 12 may trap heat and prevent some amount of heat loss from the surface 28 of the swimming pool 10. More particularly, the swimming pool cover 12 acts as an insulator against the reduced ambient temperatures of night.

Figure 4:
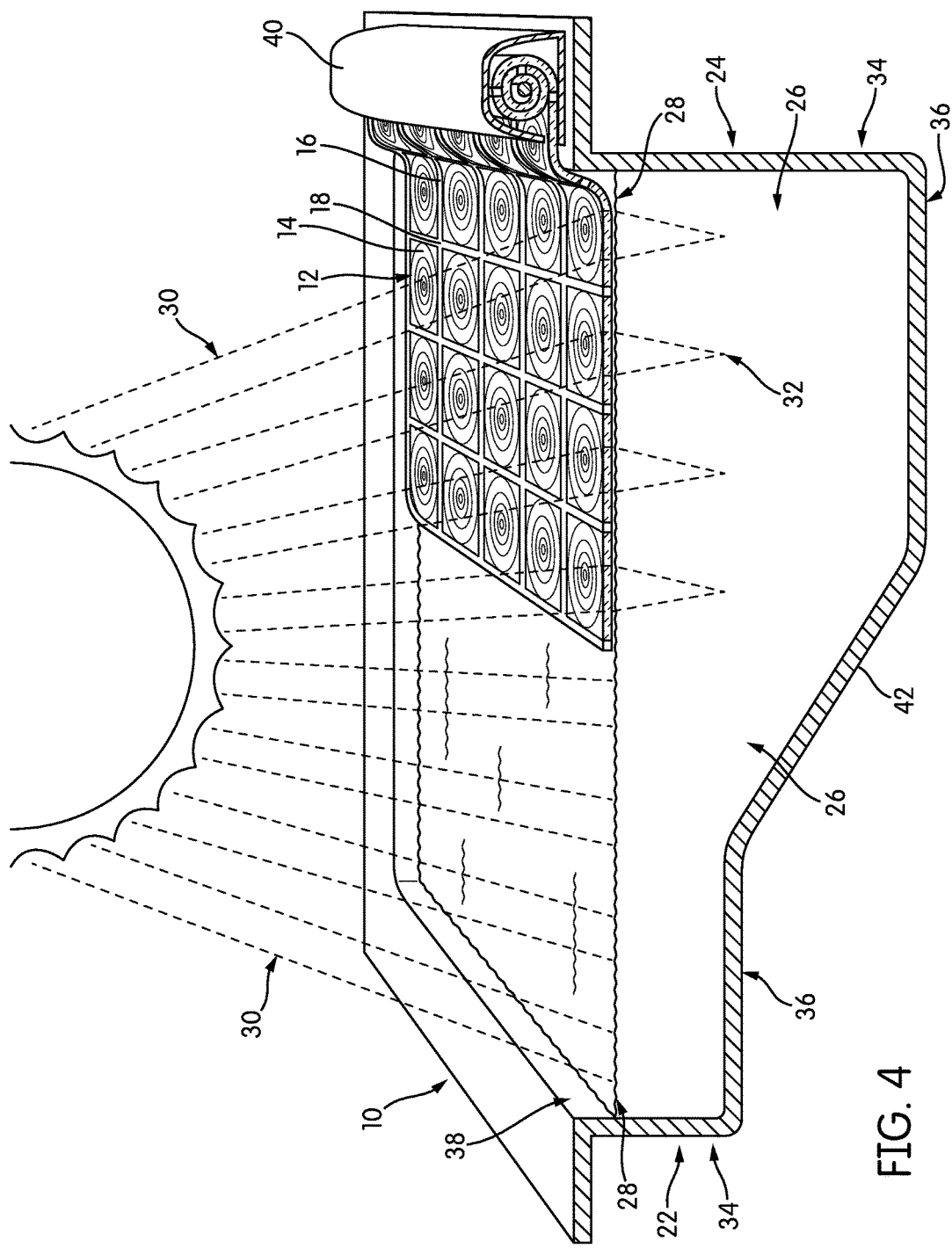
FIG. 4 is a view similar to FIG. 3 of the swimming pool cover of FIG. 1 partially retracted and stored.

FIG. 4 is a partially sectional perspective view of the swimming pool cover 12, similar to the view of FIG. 3, illustrating the pool cover 12 being retracted and stored in a storage container 40. The retraction mechanism (not shown specifically in FIG. 4) may be either manual or automatic. When the swimming pool 10 is in use, the swimming pool cover 12 may be stored by being wound in a circular fashion or folded in an accordion or bellows pattern. The method by which the swimming pool cover is gathered and stored may depend upon the size and shape of the lenses 14 used in the cover. One advantage of using thin, flexible lenses is that the resulting swimming pool cover 12 may be able to be retracted and wound or folded by a conventional automatic or manual mechanism, without requiring extensive modifications.

While the invention has been described with respect to certain embodiments, the description is intended to be exemplary, rather than limiting. Modifications and changes may be made within the scope of the invention, which is defined by the claims.

What is claimed is:

1. A swimming pool cover, comprising:
  a continuous sheet of substantially constant thickness comprised of a plurality of flexible lenses arranged in a matrix with flexible interstitial connecting material so the lenses cover substantially the entirety of a surface area of the swimming pool cover wherein the lenses are removably connected to the interstitial connecting material.

2. The swimming pool cover of claim 1, wherein the lenses are Fresnel lenses.

3. The swimming pool cover of claim 2, wherein the interstitial connecting material is at least translucent.

4. The swimming pool cover of claim 3, wherein the lenses are rectangular.

5. The swimming pool cover of claim 4, wherein the swimming pool cover is substantially rectangular.

6. The swimming pool cover of claim 1, wherein the lenses are fastened to the interstitial connecting material with hook-and-loop fastener.

7. The swimming pool cover of claim 2, wherein the lenses are polygonal.

8. The swimming pool cover of claim 2, wherein the lenses are triangular.

9. The swimming pool cover of claim 4, wherein the pool cover is rounded.

10. A swimming pool cover, comprising:
- a continuous sheet of substantially constant thickness comprised of a plurality of flexible Fresnel lenses arranged in a matrix and detachably connected to flexible interstitial connecting material so the lenses cover substantially the entirety of a surface area of the swimming pool cover.

11. The swimming pool cover of claim 10, wherein the lenses are fastened to the interstitial connecting material with hook-and-loop fastener.

* * * * *